United States Patent [19]

Kato

[11] Patent Number: 4,550,005

[45] Date of Patent: Oct. 29, 1985

[54] EXTRUSION DIE FOR CERAMIC HONEYCOMB STRUCTURE

[75] Inventor: Kiminari Kato, Nagoya, Japan

[73] Assignee: NGK Insulators, Ltd., Japan

[21] Appl. No.: 583,203

[22] Filed: Feb. 24, 1984

[30] Foreign Application Priority Data

Sep. 24, 1983 [JP] Japan ................................ 58-175174

[51] Int. Cl.$^{4}$ ................................................ B29F 3/04

[52] U.S. Cl. ................................ 264/177 R; 425/380; 425/461; 264/209.1

[58] Field of Search ............... 425/467, 466, 461, 331, 425/462–465, 197, 376 R, 380; 264/209.1, 103, 177 R

[56] References Cited

U.S. PATENT DOCUMENTS 4,298,328 11/1981 Frost .................................. 425/467
4,321,025 3/1982 Cunningham ........................ 425/467
4,384,841 5/1983 Yamamoto et al. ................ 425/467
4,468,366 8/1984 Socha, Jr. ........................... 425/466

*Primary Examiner*—Jay H. Woo
*Assistant Examiner*—J. Fortenberry
*Attorney, Agent, or Firm*—Parkhurst & Oliff

[57] ABSTRACT

An extrusion die for a ceramic honeycomb structure having a plurality of different wall thicknesses and at least two through-hole comprises discharge slots corresponding to the cross-sectional shape of the ceramic honeycomb structure and feed passageways formed in communication with said discharge slots. The hydraulic diameters of the feed passageways which communicates with discharge slots which result in thinner wall in the honeycomb structure are comparatively larger than the hydraulic diameters of the feed passageways which communicate with discharge slots which result in thicker walls in the honeycomb structure. The invention can also include a replaceable perforated plate attached on inlet portions of the feed passageways of an extrusion die. The completely novel extrusion die is suitable for use in obtaining a ceramic honeycomb structure having at least two difference types of wall thicknesses and defining through-holes of complex shapes.

10 Claims, 15 Drawing Figures

EXTRUSION DIE FOR CERAMIC HONEYCOMB STRUCTURE

BACKGROUND OF THE INVENTION

This invention relates to an extrusion die for ceramic honeycomb structures, and more specifically to an extrusion die for ceramic honeycomb structures, each having a plurality of different walls thicknesses, such as catalyst carriers for the purification of engine exhaust gases, heat exchangers or rotors for superchargers.

The term "ceramic honeycomb structure" as used herein will hereinafter be in reference to a ceramic structure in which a plurality of through-holes are separated from each other by partition walls in the form of a honeycomb body.

There are known ceramic honeycomb structures which individually have a plurality of different wall thicknesses in each honeycomb body. Such honeycomb structures can improve the mechanical strength of peripheral edge portions thereof so that they may be used as catalyst carriers for the purification of automobile exhaust gases, whereby the outermost peripheral walls can be thicker (Japanese Patent Publication No. 28,850/79) and the partition walls can be thicker at outer peripheral parts thereof than inner parts thereof (Japanese Patent Publication No. 50,170/82). FIG. 1 illustrates a known extrusion dies for forming such a structure. As illustrated in FIG. 1, a die 1 provided with a mask 5 on a peripheral edge portion of discharge slots 2 corresponding to the cross-sectional outer shape of a ceramic honeycomb structure so as to unite extruded walls which correspond to the peripheral edge portion of the discharge slots. In addition, there has also been proposed, as shown in FIG. 2, a die 1 equipped with ceramic batch feed passageways 3, which are formed broader as the widths of their corresponding discharge slots 2 become greater.

Extrusion dies of such conventional structures may be employed for extruding honeycomb structures which have through-holes of geometrically-simple shapes such as triangular, square and hexagonal shapes and wall thicknesses which vary relatively little. However, when they were used to form honeycomb structures having wall thicknesses of at least two different types and defining through-holes having complex structures such as rotors for superchargers as depicted in FIG. 3, the extrusion speeds of extrudable ceramic batches is uneven and it is impossible to produce such honeycomb structures by known extrusion technique.

SUMMARY OF THE INVENTION

An object of this invention is to provide a completely novel extrusion die suitable for use in obtaining a ceramic honeycomb structure having at least two different types of wall thicknesses and defining through-holes of complex shapes.

An object of the present invention is to provide an extrusion die for a ceramic honeycomb structure having a plurality of different wall thicknesses and at least two through-holes, said extrusion die comprising discharge slots corresponding to the cross-sectional shape of the ceramic honeycomb structure which is to be extruded and feed passageways formed in communication with said discharge slots. The hydraulic diameters of the feed passageways which communicate with discharge slots which result in thinner walls in the honeycomb structure are comparatively larger than the hydraulic diameters of the feed passageways which communicate with discharge slots which result in thicker walls in the honeycomb structure.

A further object of the invention is to provide a method of extruding a honeycomb structural body having a plurality of different wall thicknesses and at least two through-holes, wherein an extrusion die for the ceramic honeycomb structure comprises discharge slots corresponding to the cross-sectional shape of the ceramic honeycomb structure and feed passageways formed in communication with said discharge slots. Likewise, the hydraulic diameters of the feed passageways which communicate with discharge slots which results in thinner walls in the honeycomb structure are comparatively larger than the hydraulic diameters of the feed passageways which communicate with discharge slots which result in thicker walls in the honeycomb structures, wherein the method comprises; feeding a ceramic green material into said feed passageways with pressure, feeding said green material into discharge slots from said passageways, flowing said green material fed into discharge slots in directions perpendicular to the direction of the extrusion simultaneously with the flow in the direction of the extrusion, and integrating the thus extruded green material to form a ceramic honeycomb structural body.

The extrusion die according to the present invention may further comprise a replaceable perforated plate attached on inlet portions of the feed passageways. Additionally, the ratio of greatest width $T_1$ to the smallest width $T_2$ should satisfy the following inequality: $1<T_1/T_2\leqq 300$.

BRIEF DESCRIPTION OF THE DRAWINGS

FIG. 3 is a bottom plan view of the extrusion die of FIG. 4;

Figure 1:
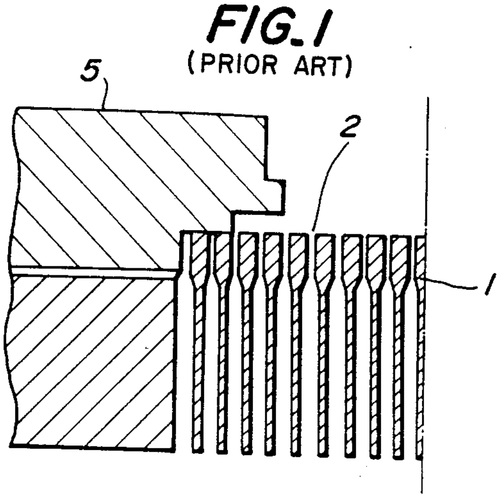
FIG. 1 (PRIOR ART)
FIG. 1 is a partial cross-sectional view of conventional extrusion die for ceramic honeycomb structure.
Figure 2:
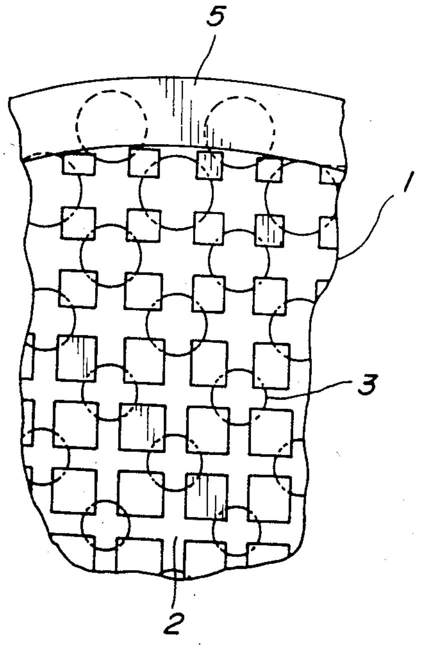
FIG. 2 (PRIOR ART)
FIG. 2 is a front partial view of a conventional extrusion die for ceramic honeycomb structure.
Figure 3:
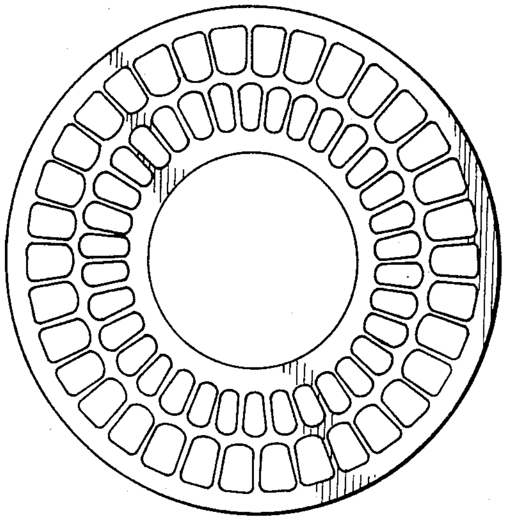
FIG. 3 is a front view of a ceramic honeycomb structure formed in accordance with the present invention.
Figure 4:
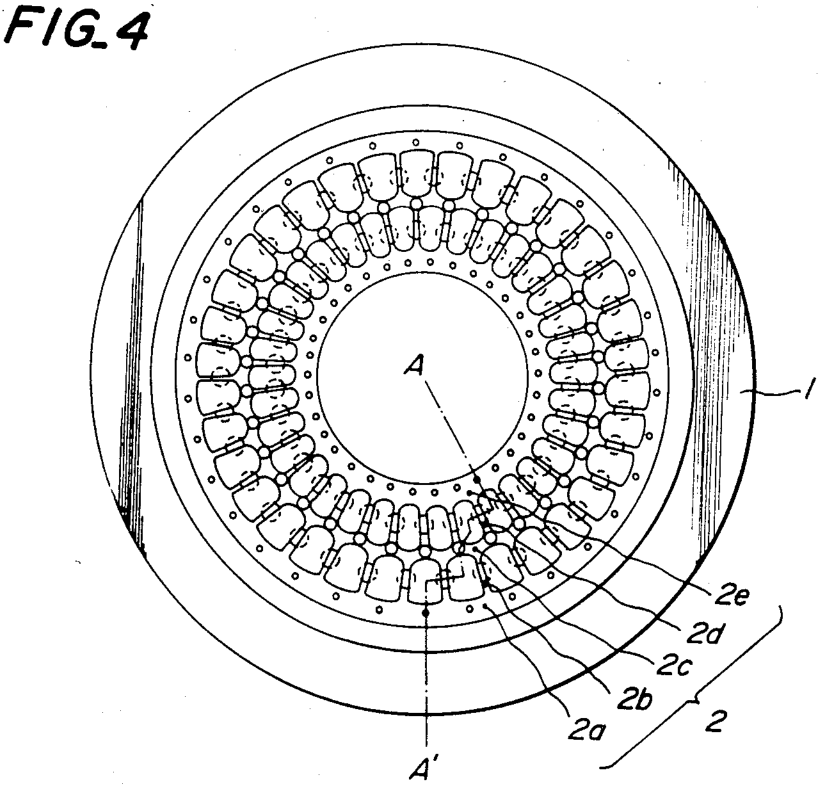
FIG. 4 is a front view of an extrusion die according to one embodiment of this invention, said die being suitable for producing ceramic honeycomb structures, as viewed from the extruding side thereof.
Figure 5:
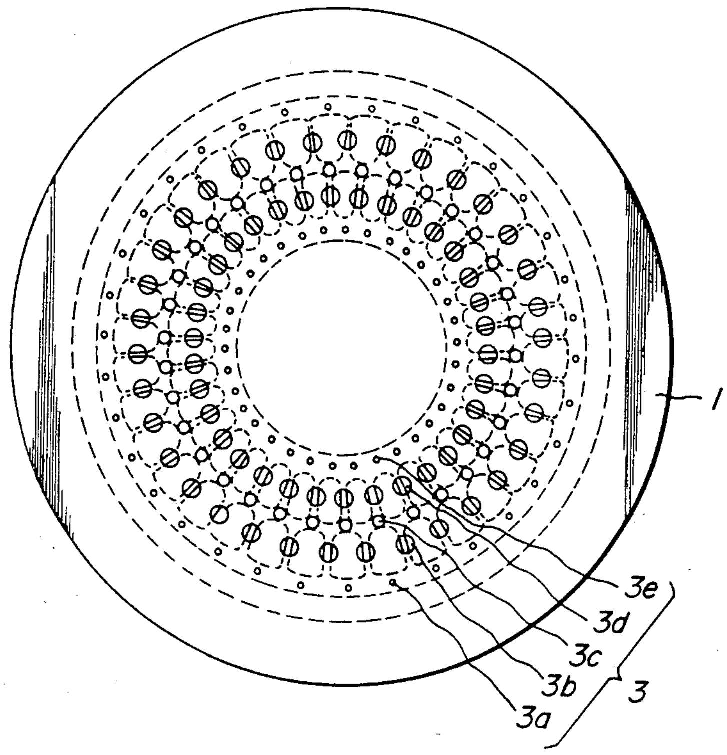
Figure 6:
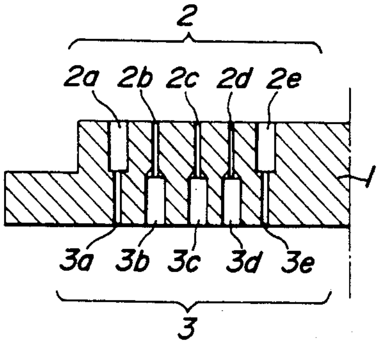
FIG. 6 is a cross-sectional developed view taken along line A—A' of FIG. 4.

Similar reference characters have been used in the Figures, wherein 1 is an extrusion die for ceramic honeycomb structures, 2, 2*a*, 2*b*, 2*c*, 2*d*, 2*e* are discharge slots, 3, 3*a*, 3*b*, 3*c*, 3*d*, 3*e* are feed passageways for ceramic batch, 4 is a cylinder of extruder, 5 is a mask, 6, 6*a*, 6*b*, 6*c*, 6*d*, 6*e* are openings, 7 is a perforated plate, T, $T_1$, $T_2$ are widths of discharge slots, and D, $D_1$, $D_2$ are hydraulic diameters.

DESCRIPTION OF THE PREFERRED EMBODIMENT

The details of the present invention will hereinafter be described with reference to the accompanying drawings.

As illustrated in FIGS. 4 through 7, an extrusion die (hereinafter referred to as "die") 1 according to this invention, which is suitable for use in the production of a ceramic honeycomb structure, is formed principally of ceramic batch feed passageways (hereinafter referred to as "feed passageways") 3, 3*a*, 3*b*, 3*c*, 3*d*, 3*e* formed at the extruder side (batch feed side) and discharge slots 2, 2*a*, 2*b*, 2*c*, 2*d*, 2*e* formed in communication with the feed passageways and adapted to form a ceramic batch, which has been fed into the feed passageways, into a ceramic honeycomb structure. Namely, the discharge slots form the partition walls and peripheral wall of the ceramic honeycomb structure. Thus, the discharge slots comprise different widths depending on the types of partition walls to be produced. For example, the discharge slots 2*a*, 2*e* having broader forming widths are provided for partition walls having greater thicknesses and the discharge slots 2*b*, 2*c*, 2*d* having smaller forming widths are provided for partition walls having smaller wall thicknesses.

Figure 7:
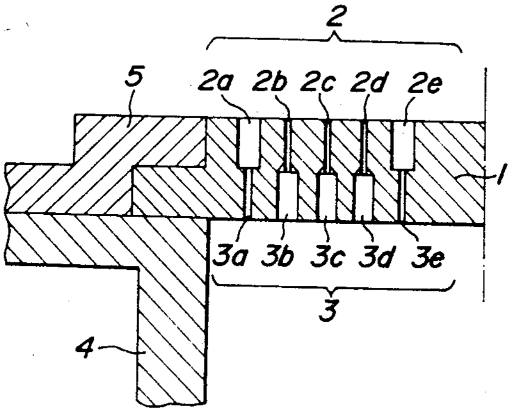
FIG. 7 is a cross-sectional developed view of the die of FIG. 4, which has been mounted on the cylinder of an extruder by means of a mask.

The outer peripheral wall may be formed by discharge slots in the die 1, as shown in FIG. 7. Alternatively, the inner peripheral wall of a mask 5, which is used to mount the die 1 on the cylinder 4 of an extruder as illustrated as another embodiment of this invention in FIG. 8, may be formed to make up a part of the outer peripheral wall.

Figure 8:
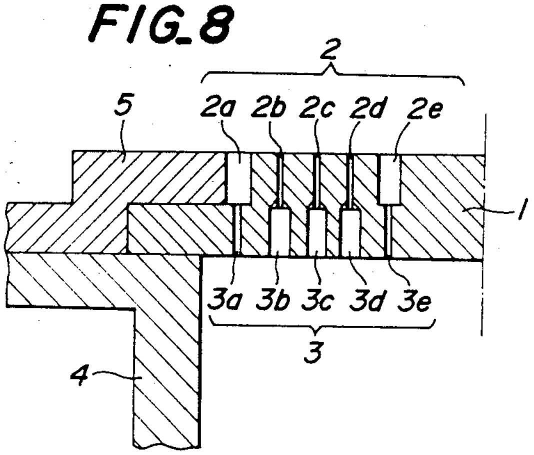
FIG. 8 is a cross-sectional developed view of an extrusion die according to another embodiment of this invention, in which the peripheral wall of a honeycomb structure is formed by the inner peripheral wall of a mask.

The discharge slots may take a variety of shapes and may be arranged in various ways as illustrated in FIGS. 7 and 8, depending on the configurations of each ceramic honeycomb structure. Depending on their dimensions and material making up the die, the discharge slots may be formed by a method known per se in the art, for example, by the electrical discharge machining technique.

The widths of the discharge slots may range within such a range that the ratio of the greatest width $T_1$ to the smallest width $T_2$ ranges from 1 (not inclusive) to 300 (inclusive), namely, satisfies the following inequality: $1<T_1/T_2\leqq 300$. If the above ratio is greater than 300, it is necessary to make the dimensions of feed passageways corresponding to discharge slots of greater widths extremely small. This renders the machining of the die difficult. In addition, the extrudable ceramic batch, which has been fed from the feed passageways, does not flow sufficiently in directions normal to the direction of the extrusion within the discharge slots, thereby failing to cause the ceramic batch to hold together and hence fails to form a ceramic honeycomb structure.

It is necessary to provide the feed passageways at the intersecting portions or intermediate portions between intersecting portions of the discharge slots and at the cylinder side of the extruder. Furthermore, the hydraulic diameters of the feed passageways are required to correspond to the widthwise dimensions of their corresponding discharge slots.

Namely, as illustrated in FIGS. 7 and 8, the feed passageways 3*a*, 3*e* having smaller hydraulic diameters and the feed passageways 3*b*, 3*c*, 3*d* having greater hydraulic diameters are provided corresponding to and in communication with the discharge slots 2*a*, 2*e* having greater widths and the discharge slots 2*b*, 2*c*, 2*d* having smaller widths, respectively.

Communication of the discharge slots with the feed passageways herein means penetration of the discharge slots through at least a part of the feed passageways.

The ceramic green material fed to the feed passageways with pressure then flows into the discharge slots. The ceramic green material flows into the discharge slots also flows simultaneously in directions perpendicular to the extrusion direction. The extruded green materials are thereby integrated to form a ceramic honeycomb structure body. The above description is fully described in the U.S. Pat. No. 3,790,654, granted to Rodney D. Bagley, and the U.S. Pat. No. 3,824,196, granted to John Jones Benbow et al., the disclosures of which are hereby incorporated by reference. In order to cause the ceramic batch to combine or integrate within the discharge slots, it is necessary to determine the dimensions, number and arrangement of the feed passageways in such a way that the discharge slots are sufficiently filled up with the ceramic batch. Furthermore, it is also required to adjust the depths of the discharge slots so that the discharge slots are filled up with the ceramic batch. A thorough consideration is indispensable especially where discharge slots having large widths and discharge slots having small widths are provided side by side. In such an extreme case that the ceramic batch flows toward discharge slots having larger widths, it may be possible to provide, between each of the discharge slots having the large widths and its corresponding discharge slot having the small width, some means capable of impeding the flow of the ceramic batch therethrough.

Figure 9:
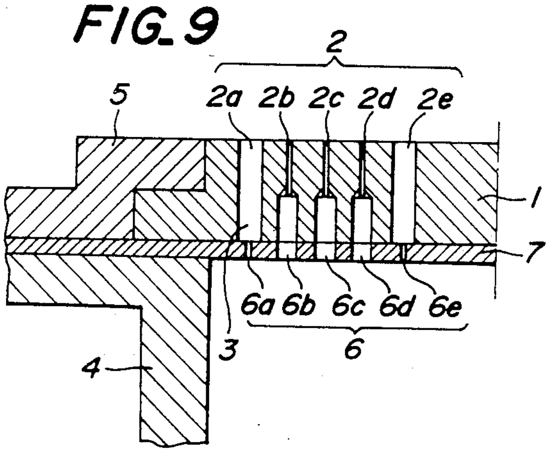
FIG. 9 is a cross-sectional developed view of an extrusion die according to a further embodiment of this invention, in which a perforated plate is provided.

The principal feature of this invention resides in the control of flow of each ceramic honeycomb structure which is being discharged from the discharge slots. It is not necessarily limited to achieve the above control by adjusting the hydraulic diameters of feed passageways as shown in FIGS. 7 and 8. It may also be possible to achieve the above control in the manner depicted in FIG. 9, namely by providing a peforated plate at the side of the cylinder 4 of an extruder. In the embodiment shown in FIG. 9, the extrusion die 1 has a plurality of feed passageways 3 having substantially the same hydraulic diameters, i.e., on the inlet portions of the feed passageways 3 are substantially equivalent. However, openings 6*a*–6*e* in a perforated plate 7 comprise a plurality of differently sized openings. The openings 6*a*, 6*e* of smaller hydraulic diameters are in registration with the discharge slots 2*a*, 2*e* having the greater widths and openings 6*b*, 6*c*, 6*d* of greater hydraulic diameters are in registration with the discharge slots 2*b*, 2*c*, 2*d* having the smaller widths. An extrusion die in which the flow of the ceramic batch is controlled by a perforated plate is effective in controlling the flows of the ceramic batch partially in the discharge slots and feed passageways when fabricating a die portion defining the discharge slots and a die portion containing the feed passageways separately and then combining them into a discharge die having configurations corresponding to the configurations of a ceramic honeycomb structure. Thus, by combining a perforated plate having a plurality of differently sized openings, with an extrusion die having a plurality of openings of substantially the same size, results in substantially equivalent batch flow in comparison to a unitary extrusion die having a plurality of differently sized inlet openings internal therein.

Next, description will be made on a process in which a ceramic honeycomb structure having a plurality of different wall thicknesses is to be produced using an extrusion die according to this invention.

A ceramic batch is first of all fed under pressure from the cylinder of an extruder into the feed passageways of the extrusion die. Here, the ceramic batch in feed passageways of smaller hydraulic diameters is subjected to greater resistance by the inner walls of the feed passageways than that present in feed passageways of greater hydraulic diameters. Accordingly, the former ceramic batch flows at a lower speed than the latter ceramic batch. On the other hand, the forming speed of the ceramic batch in discharge slots of greater widths becomes faster than the forming speed of the ceramic batch in discharge slots of smaller widths. Namely, the extrusion-forming speed of the ceramic batch becomes uniform at the front face of the extrusion die. In other words, the ceramic honeycomb structure is extruded at the same speed at both portions having thicker walls and thinner walls because the dimensions of the feed passageways and those of their corresponding discharge slots are determined in such a way that they conpensate with each other. Thus, a good ceramic honeycomb structure can be obtained.

EXAMPLE

Figure 10:
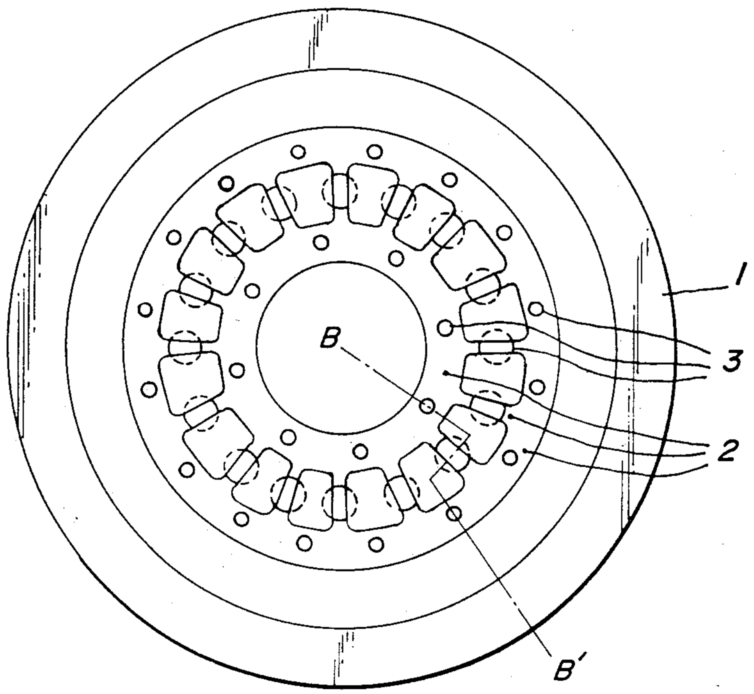
FIG. 10 is a front view of an extrusion die used in the example of this invention.
Figure 11:
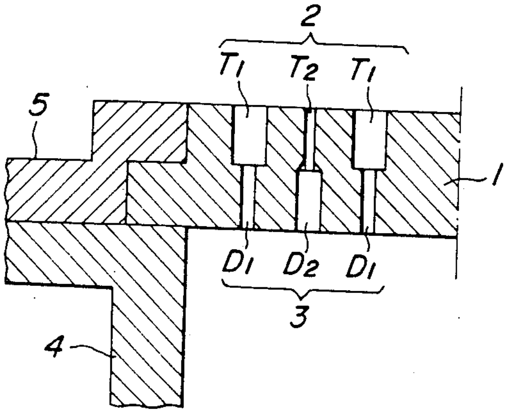
FIG. 11 is a cross-sectional developed view taken along line B—B' of FIG. 10.
Figure 12:
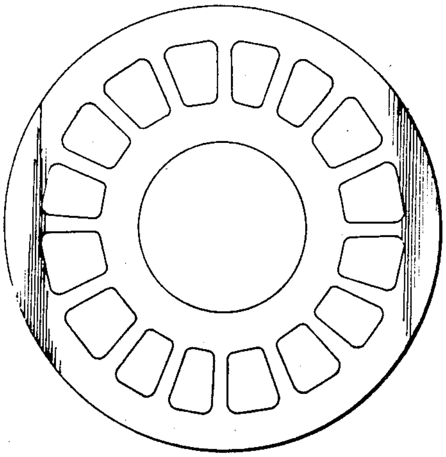
FIG. 12 is a front view of a ceramic body extruded in the example of this invention.
Figure 13:
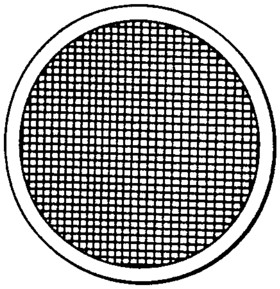
FIGS. 13, 14 and 15 are respectively front views of ceramic bodies extruded in the other examples of this invention.
Figure 14:
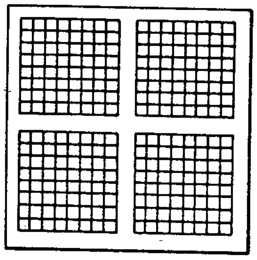
Figure 15:
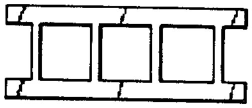

An extrudable ceramic batch, which had been prepared by tempering 100 parts by weight of ceramic powder obtained by mixing, as sintering additives, 5.0 parts by weight of magnesium oxide powder, 4.2 parts by weight of cerium oxide powder and 0.8 part by weight of strontium oxide to 90 parts by weight of silicon nitride powder, 2 parts of an organic binder consisting principally of methyl cellulose as an extrusion aid and 25 parts of water, was extruded through an extrusion die 1 having discharge slots of widths T and feed passageways of hydraulic diameters D as illustrated in FIGS. 10 and 11. Individual dimensions of the extrusion die are given in Table 1. Extruded ceramic bodies were each inspected visually to determine whether it was formed into such a desired shape as shown in FIG. 12 and whether any cracks developed. Ceramic bodies, which were found acceptable by the above visual inspection, were then prefired at 500° C. in the atmosphere to burn out the organic binder. They were thereafter fired at 1,750° C. for 2 hours in a nitrogen atmosphere. The resultant fired ceramic bodies were subjected to a visual inspection to determine whether any cracks, deformation and the like were developed. Inspection results are shown in Table 1.

TABLE 1

| | No. | Dimensions (mm) of slot widths (T) and hydraulic diameters (D) of feed passageways | | | | Ratio of slot widths | Inspection results* |
|---|---|---|---|---|---|---|---|
| | | $T_1$ | $D_1$ | $T_2$ | $D_2$ | $T_1/T_2$ | |
| Extrusion die of the invention | 1 | 5 | 3.0 | 0.8 | 6 | 6.3 | o |
| | 2 | 13 | 0.8 | 0.05 | 10 | 260 | o |
| | 3 | 3 | 2.7 | 2.5 | 3.1 | 1.2 | o |
| | 4 | 8 | 1.6 | 0.15 | 8 | 53.3 | o |
| Comparative Ex. | 5 | 16 | 0.7 | 0.05 | 10 | 320 | Δ |
| | 6 | 5 | 6 | 0.8 | 6 | 6.3 | x |
| | 7 | 5 | 3 | 0.8 | 3 | 6.3 | x |

*o: Acceptable after both extrusion and firing.
Δ: Acceptable after extrusion but unacceptable due to development of cracks after firing.
x: Unacceptable due to development of cracks and deformation even after extrusion.

As apparent from the above description, the extrusion die according to this invention facilitates the production of ceramic honeycomb structures which are each equipped with walls of different thicknesses and are suitable as catalyst carriers for the purification of the exhaust gases from internal combustion engines, heat exchangers or rotors for superchargers. Thus, the extrusion die according to this invention enjoys great commercial utility.

What is claimed is:

1. A method of extruding a honeycomb structural body having a plurality of different wall thicknesses, said wall thicknesses ranging in size from comparatively thick to comparatively thin, and at least two through holes, wherein an extrusion die assembly for use in the extruding method comprises a plurality of discharge slots corresponding to a cross-sectional shape of the honeycomb structure which is to be produced; batch feed passageways in communication with said plurality of discharge slots, the batch feed passageways having hydraulic diameters of at least two different sizes, wherein the batch feed passageways which communicate with discharge slots which produce said comparatively thin wall thicknesses have hydraulic diameters which are larger than hydraulic diameters of the batch feed passageways which communicate with discharge slots which produce said comparatively thick wall thicknesses, the method comprising;

pressurized feeding of a green material into said batch feed passageways;

feeding said green material into said plurality of discharge slots from said batch feed passageways;

flowing said green material which is fed into said discharge slots, in directions substantially perpendicular to an extrusion flow direction of said green material when it is fed into said batch feed passageways, said perpendicular flow occurring simultaneously with said extrusion direction flow; and integrating the thus extruded green material to form a honeycomb structural body.

2. An extrusion die assembly for producing a ceramic honeycomb structure having a plurality of different wall thicknesses, said wall thicknesses ranging in size from comparatively thick to comparatively thin, and at least two through holes, said extrusion die assembly comprising:

a plurality of discharge slots corresponding to a cross-sectional shape of the ceramic honeycomb structure which is to be produced;

batch feed passageways in communication with said plurality of discharge slots, the batch feed passageways having hydraulic diameters of at least two different sizes, wherein the batch feed passageways which communicate with discharge slots which produce said comparatively thin wall thicknesses in the ceramic honeycomb structure have hydraulic diameters which are larger than hydraulic diameters of the batch feed passageways which communicate with discharge slots which produce said comparatively thick wall thicknesses in said ceramic honeycomb structure.

3. The extrusion die assembly of claim 2, wherein a perforated plate having a plurality of differently sized openings therein is attached to an inlet side of said batch feed passageways, wherein smaller openings in said perforated plate communicate with said discharge slots which produce said comparatively thick wall thickness and larger openings in the perforated plate communicate with discharge slots which produce said comparatively thin wall thicknesses.

4. The extrusion die assembly of claim 2, wherein said discharge slots and said hydraulic diameters of the batch feed passageways are included in a unitary die.

5. The extrusion die assembly of claim 2, wherein a ratio between said discharge slots which produce said comparatively thick wall thicknesses to said discharge slots which produce said comparatively thin wal thicknesses is within the range of greater than 1 and less than or equal to 300.

6. The extrusion die assembly of claim 2, wherein a ratio between said discharge slots which produce said comparatively thick wall thicknesses to said discharge slots which produce said comparatively thin wall thicknesses is within the range of greater than 1.2 and less than or equal to 260.

7. The extrusion die assembly of claim 2, wherein said discharge slots penetrate into at least a part of the batch feed passageways.

8. The extrusion die assembly of claim 2, wherein said discharge slots which produce said comparatively thick wall thicknesses are peripherally located around an exterior portion of said extrusion die assembly.

9. The extrusion die assembly of claim 8, wherein said extrusion die assembly is annular and said discharge slots which produce said comparatively thick wall thicknesses are also located around an inner peripheral portion of the annular extrusion die assembly.

10. The extrusion die assembly of claim 9, wherein said discharge slots which produce said comparatively thin wall thicknesses are located between said discharge slots around said outer peripheral portion of the annular extrusion die assembly and said discharge slots around said inner peripheral portion of said annular extrusion die assembly.

* * * * *